Jan. 3, 1967    E. R. STANDFUSS    3,295,866
ARTICULATED RESILIENT HITCH CONSTRUCTION
Filed May 21, 1964    4 Sheets-Sheet 1

INVENTOR.
E. R. STANDFUSS
BY

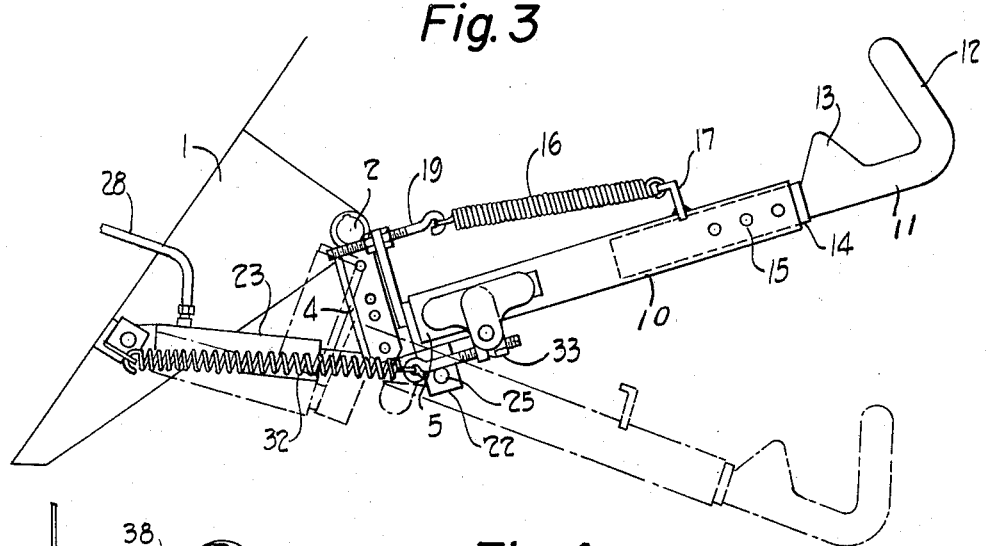
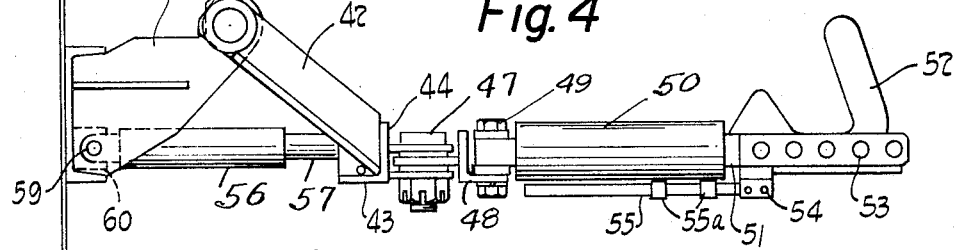
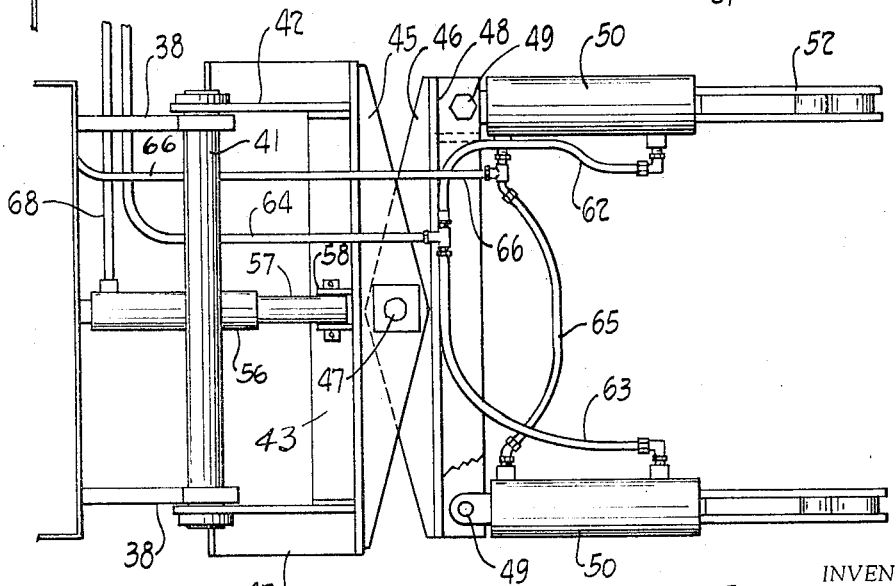

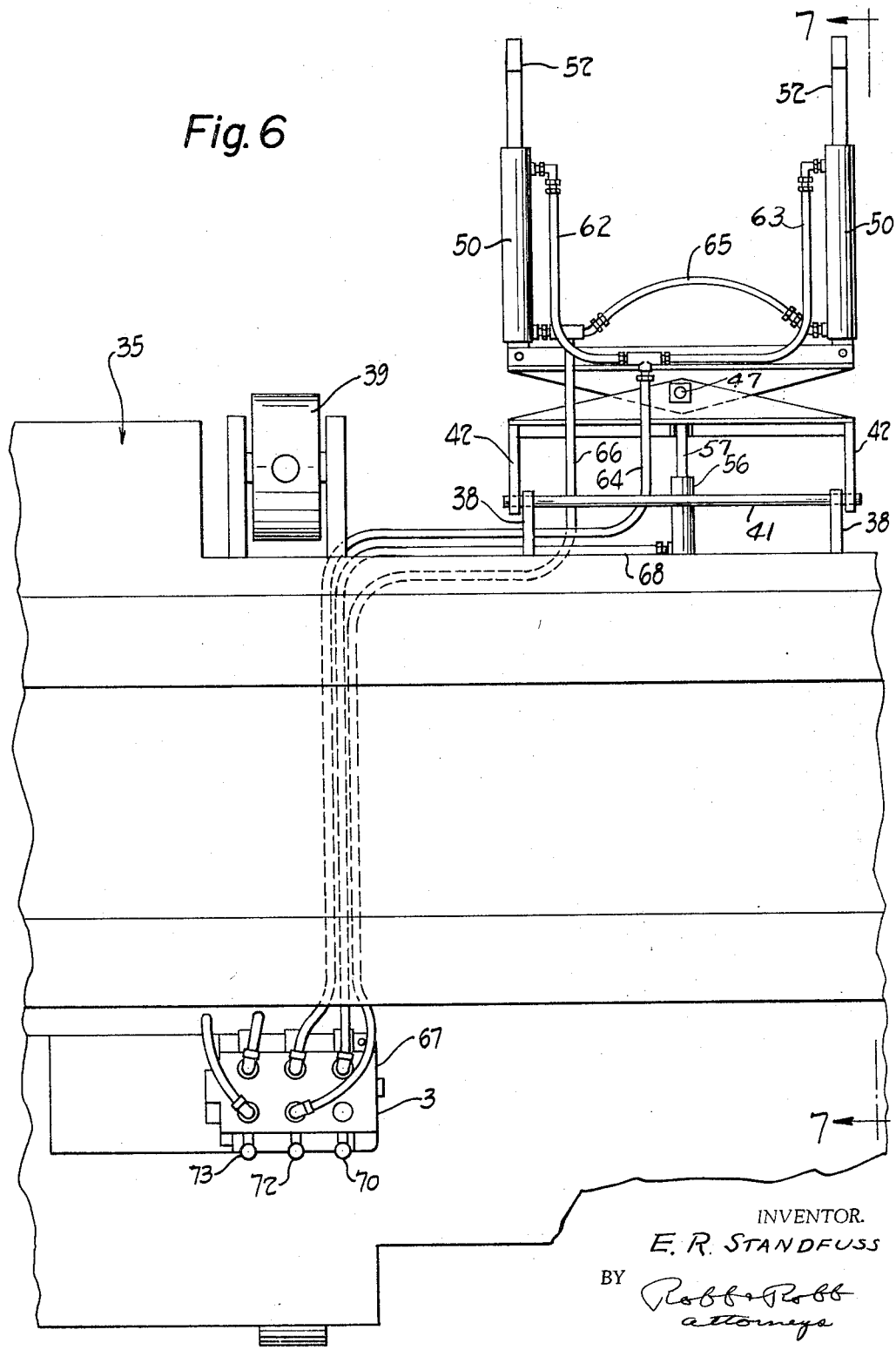

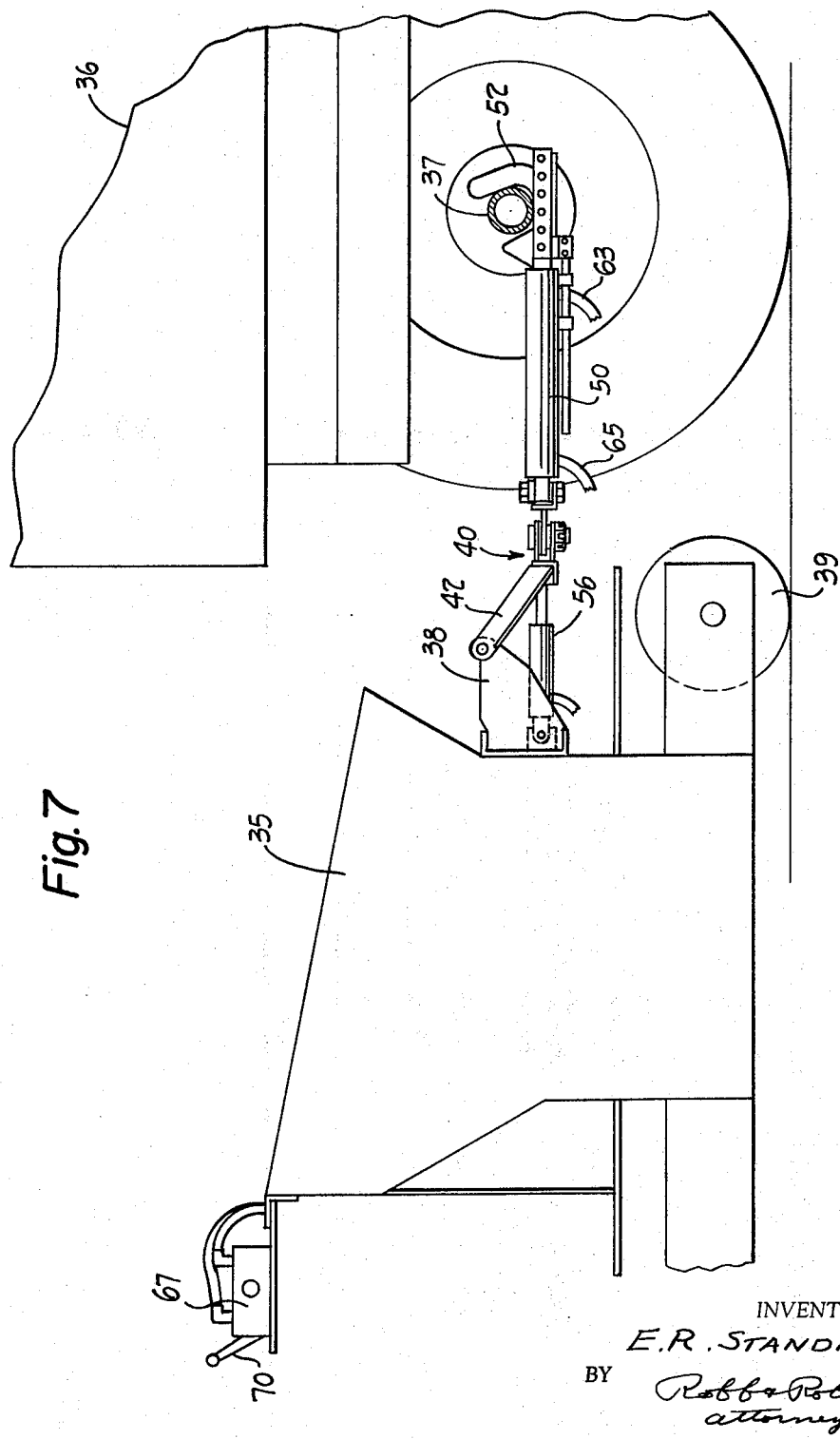

United States Patent Office 3,295,866
Patented Jan. 3, 1967

3,295,866
ARTICULATED RESILIENT HITCH
CONSTRUCTION
Ernest R. Standfuss, Bucyrus, Ohio, assignor to The Burch Corporation, Crestline, Ohio, a corporation of Ohio
Filed May 21, 1964, Ser. No. 369,273
5 Claims. (Cl. 280—479)

This invention relates to vehicular hitch construction and primarily to such construction as is most suitable for use with construction machinery where it is desirable or necessary to quickly connect a towing vehicle to a towed vehicle and disconnect the same therefrom without the necessary interposition of a person therebetween, thereby obviating possible injury to such person.

It is a more specific object of this invention to provide hitch construction of the class described, in which a towed vehicle for example, a construction apparatus adapted to spread stone, slag or similar materials, is connected for simultaneous movement and spreading of said material, to a towing truck from which the material is intended to be dumped into a hopper carried by the towed vehicle, thus making desirable the provision of means to connect the towed and towing vehicle simply, quickly and effectively for manipulation by the supply truck, the foregoing being accomplished hereby in a simple expeditious manner.

Yet another object of this invention is to provide a novel form of hitch unit, in which upwardly open hook members are provided adapted to connect with the rear axle of a truck or the like, so that the truck furnishes the motive power for the towed vehicle, the connection being effected by the means provided and incorporating certain compensating means therein which permit the constant connection irrespective of variations in the terrain over which the vehicles are moving.

An even more specific object of the invention is to provide a particular type of hitch unit in which the means to compensate for variations in transverse attitude of the respective vehicles, may be in the form of a resilient connection, built into the hitch unit itself, which connection however is of sufficient rigidity or stiffness that the connection between the vehicles is maintained and yet permits the variations to take place without destroying or damaging either vehicle thereby.

A further specific object of the invention is to effect the permissive variation in the respective attitudes of the vehicles to be carried out in different ways, and while hitch units of such different forms are basically comparable, they are specifically different in their construction and in certain phases of their operation to accommodate for different situations or different types of vehicles being towed as the case may be.

Other and further objects of the invention will be understood from a consideration of the specification appended hereto and disclosed in the drawings wherein:

FIGURE 3 is a view similar to FIGURE 1 with the hitch moved into other positions.

FIGURE 4 is a side view, somewhat fragmentary in nature illustrating another form of hitch unit, as being attached to a slightly different type of machine or at least to a different form of attaching means.

FIGURE 5 is a top plan view of the FIGURE 4 disclosure.

FIGURE 6 is a top plan view, somewhat fragmentary in nature, illustrating a portion of a machine to which the hitch construction of FIGURES 4 and 5 is connected, and likewise disclosing the controls therefor.

FIGURE 7 is a fragmentary side view of the hitch unit of FIGURES 4, 5 and 6, in position between a towed and towing vehicle to illustrate the relationship thereof and manner of connection likewise.

Figure 1:
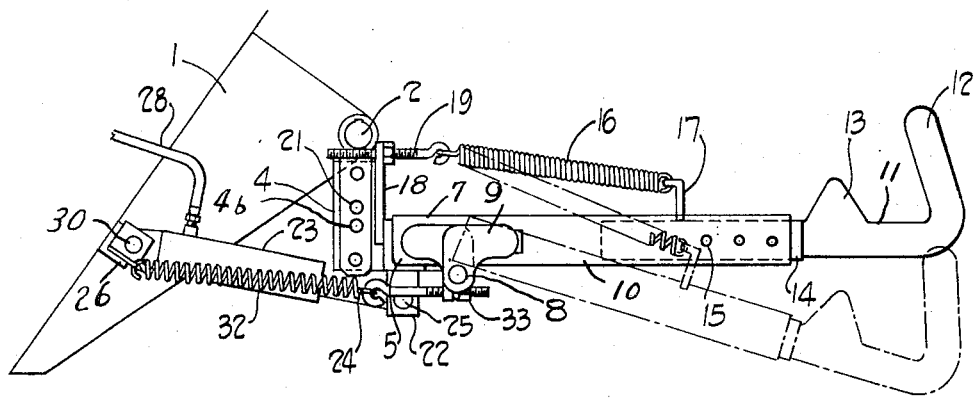
FIGURE 1 is a somewhat fragmentary view illustrating the hitch unit, as connected to a fragment of a towed vehicle and certain positions of said unit.

Referring now to FIGURE 1, the first form of hitch unit hereof, is disclosed as comprising attaching means including a pair of generally triangular shaped brackets 1 to which at one corner thereof is pivotally connected by the cross shaft 2, an attaching frame generally designated 3 and comprising the depending arms 4 at the lower extremities of which and extending transversely therebetween, is a frame part 5.

Figure 2:
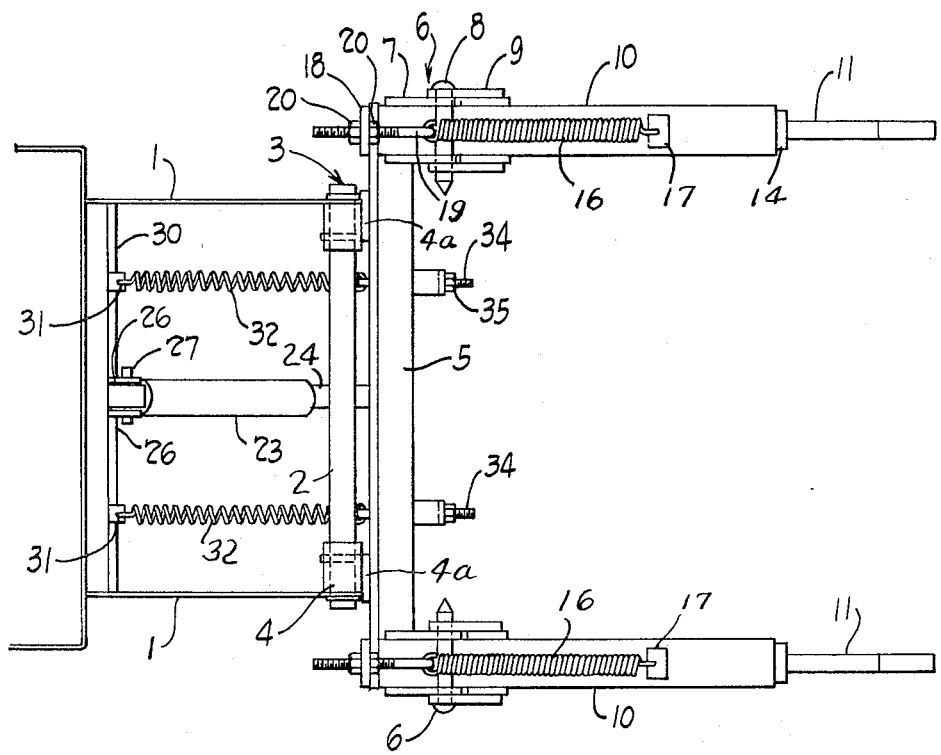
FIGURE 2 is a plan view of the disclosure of FIGURE 1.

The frame part 5 in this instance, may consist generally or basically of an angle member, a hinge unit generally denoted 6 being fixed in any preferred manner as by welding or the like at the said extremities, said hinge unit or member 6 comprising the hinge part 7 in each case pivotally connected by a pivot 8 to a further hinge part 9, the hinge part 9 in turn at each side including a forwardly extending connecting member 10 providing a U-shaped frame as viewed in FIGURE 2, with the members 10 being separately movable as set forth hereinafter.

At the outer extremity of each connecting member 10, is provided a hook element 11, being upwardly open and including the hook end 12 with an abutment 13 spaced inwardly therefrom to provide a space between which may be received a towing connection more particularly to be described subsequently.

The connecting member is in the form of a hollow tubular part, and the hook element 12 is adapted to have portion 14 thereof in each case movable interiorly of the member 10, being adjustable as by means of the openings such as are indicated in FIGURE 1 at 15 through which suitable pins or similar members may be inserted to thereby maintain the hook element 11 in adjusted position.

The hinge unit or member 6 previously mentioned in each case is of the nature of an articulated compensating connection, and is maintained in a normally closed position by means of a spring 16 connected at one end to a suitable bracket 17 fixed to the respective connecting member 10 and at its inner end adjacent the pivot 2 on an upstanding bracket part 18, fixed to frame part 5, adjustment of the spring 16 being effected by the hook bolt 19 suitably threaded as indicated so that nuts such as 20 at opposite sides of the bracket 18 may be availed of for the purpose of adjustment.

Suitable similar adjustment of the depending arms 4 to the adjustment of the connecting members and hook elements 11, may be effected. The depending arms 4 provided in pairs as shown, each engage a corresponding upwardly extending angle member 4a, which in turn is fastened to the frame part 5. These arms and members are adjustably connected by nuts and bolts or like members 21, positioned selectively in a series of openings 4b provided in the arms and angle member.

Extending downwardly from the frame part 5 is a suitable bracket about centrally and indicated at 22, this actually being a pair of brackets spaced suitably so as to receive therebetween the end of a hydraulic piston and cylinder unit generally denoted 23, the end comprising the piston rod 24 connected at 25.

The inner end of the piston and cylinder unit 23, is pivotally connected between offstanding ears 26 mounted on rod 30 by the pivot 27, and a suitable pressure line 28 extends from the appropriate end of the piston and cylinder unit 23 to a control unit in a manner to be subsequently explained in connection with the other form of the invention.

Extending between the mounting brackets 1 is a rod 30, which in turn provides support for the ends 31 of springs 32, which are connected at their opposite ends to brackets 33 depending downwardly from frame part 5 as by suitable screw eyes 34 adjustable my means of the nuts 35 provided thereon to increase or decrease the tension in the springs 32 as occasion may demand.

The function of the springs 32 is to tend to pull the entire connecting means comprising the members 10 and frame 3 downwardly pivotally clockwise about the axis of shaft 2 as viewed in FIGURE 1 when pressure is removed from the piston and cylinder unit 23 as adjustment of the hook elements 11 may demand. Of course the hydraulic piston and cylinder unit 23 will in turn tend to expand the springs 32 when upward movement of the hook elements 11 is in order.

The various positions suggested heretofore are indicated in FIGURE 3, the solid line disclosure of the connecting members and associated hook elements 11 being indicated with the dotted line position suggested as the lowered position of the respective parts.

By reason of the articulated compensating connections 6, a certain amount of excess pressure on one hook element 11 or on both as the case may be, will tend to move the connecting member 10 associated therewith downwardly pivotally around the pivot 8, against the opposing spring tension of the spring 16. Thus when the transverse attitude between the towed vehicle to which the mounting brackets 1 are connected varies from that of the towing vehicle, the articulated connection will be actuated. Similarly when the vehicles return to the respective former attitudes, the spring 16 will act to return the hook elements 11, maintaining the same at the same time in connection with the axle of the towing vehicle so that constant towing connection is maintained.

Another form of the invention is disclosed in FIGURES 4 to 7 inclusive, and as suggested in FIGURE 7, is interposed between a towed vehicle such as 35 and the truck generally denoted at 36, particularly between the rear axle 37 of such truck 36 and the mounting or attachment brackets 38 on the towed vehicle 35.

The towed vehicle 35 in this case is for example a hopper type vehicle in which stone or other aggregate from the truck 36 may be dumped and the bracket or attachment means 38 extend forwardly therefrom, the towed vehicle being supported in this instance as by front wheels 39 which may be steerable if desired and adapted for support of the vehicle 35 during motion.

In this case the hitch unit is denoted 40, and is more particularly disclosed in FIGURES 4 and 5 as to certain elements thereof, now to be referred to.

As indicated in FIGURE 4, the brackets 38 are provided in pairs spaced laterally of the vehicle 35 and support at one portion a suitable pivot 41 at the outer ends of which depend the arms 42, being provided in pairs likewise.

At the lower ends of the arms 42, is a transversely extending frame part including an angle member 43 suitably fixed to the ends of the members 42 and likewise extending forwardly from said angle member 43 at the vertical flange 44 thereof, are a pair of triangular shaped members 45 spaced vertically so as to receive therebetween a similar member 46.

The member 46 is pivotally connected to the member 45 at 47, and said member 46 is in turn welded or otherwise secured to transversely extending angle member 48 which is provided at its extremities in turn with suitable connecting means such as 49 at opposite ends for hydraulic piston and cylinder units 50, these latter being double acting as will be referred to subsequently.

The piston and cylinder units 50 will be pivotally supported within limits as previously suggested and include the pistons 51 therefor extending outwardly and provided at their extremities, that is the rods of the pistons with suitable hook elements 52, the hook elements 52 being slidably adjustably connected to piston rods 51 by means of suitable pins or bolts such as 53.

In order to maintain the hook elements 52 in their preferred vertically upwardly open attitude, a suitable ear such as 54 extending downwardly beneath the hook element 52 is equipped in turn with a rod 55 guided by ears 55a in which the rod is received so that when the piston rod 51 moves inwardly and outwardly the hook element 52 is always maintained in its proper position to interengage with the rear axle 37 for example of the towing vehicle 36.

It will be understood that both hook elements 52 are similarly equipped and substantially identical in configuration to the hook elements 11 previously mentioned.

In order to raise and lower or pivotally move the attaching frame including the members 42 and 43, a suitable piston and cylinder unit 56 is provided, the piston rod 57 thereof being connected between the ears 58 fastened to the angle member 43, and the other end of the piston and cylinder unit 56 being attached as by means of a suitable pivot 59 to similar ears or brackets 60 extending from the towed vehicle 35.

Suitable hydraulic connections for the piston and cylinder unit 50 which are double acting as previously indicated are provided in the form of hoses 62 and 63 extending to a common supply line 64, a similar hose 65 connected to both units and in turn connected to a supply line 66 likewise being provided and extending to a control valve generally denoted 67.

The piston and cylinder unit 56 is similarly supplied by a supply line 68 likewise extending to the control valve 67.

The control valve shown here is known generally and may be one such as made by Gresen Manufacturing Company as disclosed in their publication Form 228 incorporating therein a float position valve, for purposes now to be explained.

Initially however, it is noted that the valve 67 includes three valves therein or at least is a three spool valve, including a control lever 70 for actuating the piston and cylinder unit 56, and incorporating therein the float valve control generally known in the art, so that when the lever is in one position, both cylinder ports are open to the tank. Thus when changes in transverse attitude as between the towed vehicle 35 and the truck 36, particularly the axle 37 thereof, occur, downward pressure for example on one of the connecting members including the piston and cylinder unit 50 takes place, the pressure is dumped into the tank, and permits downward movement of the piston and cylinder unit thus preventing any damage to either of the vehicles.

It will be understood that this float control arrangement is comparable to the spring and articulated compensating connection disclosed in the first form in FIGURES 1, 2 and 3, so that a similar and safe action is permitted of the respective hitch units by the different ways of permitting compensating action to take place.

The control lever 72 is arranged so that by actuation thereof the hook elements 52 may be extended or retracted by actuation of the piston and cylinder unit 50 thereof, these latter acting as the connecting members comparable to the connecting members 10. The hydraulic piston and cylinder unit of course provides for readily adjusting the longitudinal length of the connecting members incorporating the same therein.

Since this particular valve 67 disclosed in FIGURE 6 for example happens to be a three spool valve, the control handle 73 is provided to afford steering action of the front wheels 39 if desired. This being a hydraulic actuation, of course, will necessitate the provision of hydraulic cylinder connections where steering is desired but is not shown herein as it forms no part of this invention.

In the form of the invention disclosed in FIGURES 4, 5, 6 and 7, the weight of the hitch construction itself is such that merely releasing the pressure in the hydraulic piston and cylinder unit 56, will permit the unit to pivot downwardly, obviating the necessity to provide springs such as 32 disclosed in the first form of the invention.

This action will permit the disconnection of the towed vehicle from the towing vehicle in a manner readily apparent.

In view of the provision of the means for actuating the hitch units, it will be understood that it does not necessitate a man crawling between the respective units to make any towing connection since the units are remotely operated and raised and lowered so as to move into and out of connection with the axle 37 of a towing vehicle for example at the command or under the control of an operator on the towed vehicle. The abutment provided for each of the hook elements 11, and 52, will permit backing actuation of the towed vehicle where this happens to be necessary as in maneuvering or the like.

The construction shown in FIGURES 4 to 7 inclusive, is intended for use with much heavier equipment than that of FIGURES 1 to 3 inclusive, and yet either form can be used with any type of equipment where suitable or satisfactory operation is obtainable.

I claim:

1. In vehicular hitch construction of the class described, in combination, a hitch unit, means for attaching said unit to one vehicle, upwardly open means for releasably connecting the unit to another vehicle to be towed thereby, operating means to move the connecting means upwardly into connected position, means to yieldably maintain said connecting means in said connected position, the attaching means comprising a depending attaching frame generally U-shaped in plan, the means for connecting the unit to said another vehicle comprising spaced independently, pivotally mounted connecting members, having upwardly open hooked elements at their extremities for engagement with an axle of a towing vehicle and the yieldable means facilitates independent upward and downward movement of the elements when an axle of the towing vehicle changes transverse attitude at different times from the transverse attitude of a vehicle being towed.

2. The combination as claimed in claim 1, wherein the hook elements of the members are longitudinally adjustable, and include abutment portions for axle engagement when a towing vehicle operates as a pushing vehicle.

3. The combination as claimed in claim 1, wherein the connecting members are individually pivotally connected to a frame part, and springs extend from the attaching frame to the members, to maintain the hook elements in axle engaging position.

4. The combination as claimed in claim 1, wherein a mounting part is connected to the attaching frame, the connecting members are in turn connected to said part, the members include hydraulic piston and cylinder means, and the hook elements are longitudinally adjustable by said last mentioned means.

5. The combination as claimed in claim 4, wherein the mounting part is pivotally connected to the attaching frame about centrally thereof, and the members are pivotally connected to the part at the extremities thereof.

References Cited by the Examiner

UNITED STATES PATENTS

| | | | |
|---|---|---|---|
| 2,309,082 | 1/1943 | Arndt | 280—460 X |
| 2,650,833 | 9/1953 | Wells | 280—478 |
| 2,702,501 | 2/1955 | Simpson | 280—479 X |
| 2,717,783 | 9/1955 | Flink | 280—460 X |
| 2,742,304 | 4/1956 | Clausen | 280—460 |
| 2,771,306 | 11/1956 | Ash | 280—378 X |
| 2,954,241 | 9/1960 | Warren | 280—460 X |
| 3,138,392 | 6/1964 | Holland | 280—460 |

LEO FRIAGLIA, *Primary Examiner.*